Nov. 11, 1941.    L. G. DANIELS    2,262,224
VALVE STRUCTURE
Original Filed Jan. 29, 1938

Fig. 1
Fig. 2
Fig. 3
Fig. 4
Fig. 5

Inventor:
Lee G. Daniels
By
McCanna, Wintercorn & Morsbach
Attys.

Patented Nov. 11, 1941

2,262,224

UNITED STATES PATENT OFFICE 2,262,224

VALVE STRUCTURE

Lee G. Daniels, Rockford, Ill.

Original application January 29, 1938, Serial No. 187,668. Divided and this application January 31, 1941, Serial No. 376,876

9 Claims. (Cl. 251—167)

This invention relates to valves and has special reference to a multiple port lift-turn type of valve of the general class described in my Patent 2,093,692, and in my copending application Serial No. 138,948, filed April 26, 1937.

This is a division of my copending application Serial No. 187,668, filed January 29, 1938, entitled "Valve structure."

Another object of the invention is the provision of a valve which is easier to lift and turn than prior known valves of the same type and size.

A further object of the invention is the provision of a valve of the class described characterized by the absence of resilient means between the stem plate and the handle.

A still further object of the invention is the provision of a valve wherein improved sealing means is provided between the stationary and movable members of the valve.

I have also aimed to provide a valve having a novel seating arrangement between the movable member of the valve and the gaskets.

A further object of the invention is the provision of a gasket having novel shape characteristics for supporting the same in cooperative relationship with the movable member of the valve.

Another object of the invention is the provision of a gasket having shape characteristics adapted to materially prolong the useful life thereof.

Other objects and advantages will appear from the following description and the accompanying drawing, in which—

Figure 1 is a top view of a valve embodying my invention;

Fig. 2 is a side elevation of the valve showing a portion of the valve in section;

Fig. 3 is a face view of the ported body member showing the port arrangements;

Fig. 4 is a section on the line 4—4 of Fig. 3; and

Fig. 5 is a fragmentary section through a modified form of port gasket showing portions of the cooperating body and rotor members.

Directing attention first to Figs. 2 and 3, the numeral 8 designates generally the stationary body or base member of the valve having a plurality of ports, in this instance arranged to control the flow of liquid in a zeolite water softener, a port 9 being connected through a threaded opening 11 to a source of water supply, a port 12 being connected to the incoming side of the softener, through a threaded opening 13, a port 14 being connected to the outlet from the water softener through a threaded opening 15, and ports 16 and 17, connected respectively to the service line and to drain through threaded openings such as those shown at 13 and 15. A port 18 is connected through a channel 19 to a bore 21. The bore 21 is connected to a brine tank or other source of supply regeneration solution through an opening 22 in the body member 8. Positioned in the bore 21 is a Venturi tube 23 and a jet 24 forming an injector for the purpose of withdrawing regeneration solution from the brine tank and conducting the same to the inlet of the softener by way of the port 12 and opening 13. The tube 23 is secured in position by means of a screw 25 and the opposite end of the bore 21 is closed by a plug 26. A port 27 is connected to the port 16 and serves to by-pass water to the service line during the back wash step of the regeneration cycle of the valve.

Positioned in each of the ports 12, 14, 16, 17, 18 and 27 are tubular ferrules designated generally by the numeral 28 arranged to seat to a predetermined depth within the ports. Positioned upon the outer ends of the ferrules 28 are sealing or gasket members 29 extending around and over the ferrules, formed of resilient rubber or similar material, each of the gaskets having a flat upper surface 31 and having an annular groove 32 in their lower surfaces for the reception of the outer end of the ferrules 28 (Fig. 4). The gaskets have arcuate surfaces at 29a and 29b where the flat upper surface 31 joins the side walls 31a and 31b so as to provide a continuous and well supported surface throughout the contacting and adjacent portion of the gasket. The gaskets are retained on the ferrules in any of a number of well known ways, as, for example, by stretching the rubber of the gasket or by cementing the gasket thereon. Alternately the gasket and ferrules may be formed as shown in Fig. 5, wherein ferrules 33 are provided substantially similar to the ferrules 28, the outer ends thereof being beveled as shown at 34. Positioned on the ferrules are gaskets 35 of resilient rubber or similar material, fastened as heretofore described. The upper or outer ends of the gaskets are curved convexly inwardly radially as shown at 36 so as to seat in curved concave radial recesses 37 in the stem plate or rotor member, as will presently be described, the recesses 37 surrounding each of the ports in the stem plate. In this instance the gasket is carried down along the outer side of the ferrules 33 as shown at 38 to a point in close proximity to the face of the body member 8 to impart better support under the seating pressure, to better retain the gasket on the ferrule and to serve as a further check to the passage of liquid on the interface between the gasket and the ferrule. This construction provides a somewhat better seal between the two ported members of the valve because of the manner in which the gasket distorts along the recesses under seating pressure to give a better seal, but on the other hand requires that the stem plate be seated more accurately than does the form of Fig. 4. It is also somewhat more expensive to manufacture than the former. Under some circumstances the portion of the gasket 35 which lies within the ferrules may be eliminated and the outer side 38 thereof carried down against the face of the body member to produce a satisfactory seal and likewise the portion thereof between the edge 34 and the stem plate may also be eliminated, the seal being produced by the inward pressure of the curved radial recesses 37.

Seated on the body member 8 is a housing or cover 39 which confines the flow of water to the ports and encloses a stem plate designated generally by the numeral 41 (Fig. 2). The stem plate 41 has a plurality of ports, certain of which are designated by the numerals 42 and 43, the position of which ports control the direction of flow through the valve, the stem plate being indexed for the purpose of establishing different communication between the ports of the plate and the ports of the body as described in my above-mentioned patent application. The stem plate 41 has a stem 44 projecting therefrom and extending out of the housing or cover 39 through a suitable packing arrangement designated generally by the numeral 45.

Positioned on the end of the housing 39 are spaced brackets 46 and 47 to the outer ends of which are attached an index plate 48 by means of screws or otherwise as shown at 49. The brackets 46 and 47 are in this instance integral with the housing 49 as will be apparent from Fig. 2. The index plate 48 has, in this instance, three outwardly extending projections 49, 51 and 52 on its periphery positioned at 90° angles and adapted to function in latching mechanism, as will presently be described. On the same radius with the projections are pins 53, 54 and 55 projecting upward from the surface of the plate at substantially equal distances from the center of the plate defined by the stem 44 which extends through the plate. Upstanding ribs 56 and 57 are likewise formed on the plate intermediate the pins 53, 54 and 55, as best shown in Figure 1, the ribs being arcuate and resting on the same radius. If desired, the numerals 1, 2 and 3 may be inscribed or formed on the plate opposite the pins for the purpose of designating the various valve positions.

Attached to the stem 44 on the outer side of the index plate is an arm 58 extending radially outward with respect to the plate and terminating slightly short of the periphery thereof, the arm having a larger opening as shown at 59 through which the numerals 1, 2 and 3 may be visible and a smaller opening 61 equi-distant from the center with the pins 53, 54 and 55 whereby the pins may be received in the opening 61 when the stem and rotor occupy the seated positions, one of which is shown in Fig. 2. Similar results may be obtained by placing the pins 53, 54 and 55 on the body within the housing and an ear on the stem plate having an opening or hole adapted to come into registration therewith in the same manner as the opening 61. Lugs 62 are positioned on the lower surface of the arm 58 on the same radius as the ribs 56 and 57 adapted to cooperate with the ribs in preventing the stem from being moved to the seated position of the rotor except at the designated stations.

A lever 63 having a forked end 64 is pivotally attached to the stem 44 by means of a bearing pin 65 which extends laterally outward from the stem and is journaled in the forked end 64. The outer end of the lever 63 has a ball 66 or other means for manually grasping the lever. Fulcrum projections 67 and 68 are positioned on the upper and lower sides of the lever 63 adjacent the forked inner end thereof and between the housing 39 and the index plate 48, as best shown in Fig. 2, the projections being so shaped and positioned that the projection 67 bears against a flat surface 69 on the lower side of the index plate 48 and against the flanged upper end 71 of the outer bushing 72 of the packing arrangement 45, this flanged end being sufficiently broad to provide bearing surface for the fulcrum projection at any position of the latter. Secured to the lever 63 is a collar 73 and a bearing surface 74 slidably carrying a sleeve 75 normally urged inward by means of a spring 76, the sleeve being slidable on the lever in the latching operation of the device. The sleeve 75 has an arm 77 which projects upwardly and inwardly into close proximity to the periphery of the index plate 48 in such manner as to move over the projections 49, 51 and 52 when the lever is indexed to a point therebeneath, as shown in Figs. 1 and 2. A screw and lock nut 78 is positioned in the arm 77 and is adjustable therein so that the lower end 79 thereof bears against the projections 49, 51 and 52 in the seated positions of the stem. A rod 81 projects outwardly along the lever 63, through an opening 82 in the collar 73, and is bent upwardly as shown at 83 to provide convenient means for actuation of the latch with the fingers, the finger being passed over the upwardly projecting portion 83 to move the sleeve 75 against the action of the spring 76 to withdraw the arm 77 and screw 78 from contact with the projections 49, 51 or 52.

The valve is operated as follows: Figs. 1 and 2 show the parts in the service position of the valve. In the regeneration of a water treatment apparatus such as a zeolite water softener the operator grasps the handle 66 and with the finger moves the sleeve 75 to disengage the arm 77, whereupon the lever may be rotated in a clockwise direction facing Fig. 2 about the axis 65. During this movement the fulcrum projection 68 causes the stem 44 to be moved longitudinally, thus lifting the stem plate 41 free of the gaskets to an unseated position. This lifting movement of the stem causes the arm 58 to move upward until the arm is free of the pin 55, at which point the lever 63 may be indexed or rotated about the stem as an axis in a counterclockwise direction facing Figure 1 through 180° or until the numeral 1 on the index plate appears through the opening 59. During this movement the rib 57 and the lugs 62 prevent the stem from being moved downward to a position in which the rotor might engage the gaskets, that is, these elements retain the stem plate substantially in the unseated position until the lugs ride free of the rib 57 and the rotor approaches the No. 1 position, except for the short interval when the parts are passing the No. 2 position. The operator then adjusts the radial position of the lever 63 until the pin 53 is receivable in the opening 61, at which point the lever is rotated in a counterclockwise direction facing Fig. 2, whereupon the fulcrum projection 67 acts against the surface 69 to urge the stem longitudinally downward until the stem plate reaches the seated position in which it is pressed against the gaskets 29. When the screw 78 is properly adjusted, the latch may be released at this point and the screw will bear against the projection 51, thus positively locking the stem plate in its seated position. With the particular valve under consideration this will cause the direction of flow in the softener to be reversed to back-wash the softener and water to flow to the service line from the port 27, upon the completion of which operation the operator through movements similar to those just described, indexes the valve to the No. 2 position in which communication is established between the ports to draw brine into the softener when a supplementary brine valve is opened and to rinse out the brine from the softener upon the closing of the supplementary valve. When the rinsing operation is complete, the operator again actuates the valve moving it from the No. 2 position to the No. 3 position shown in the drawing, thus returning the softener to service. The brackets 46 and 47 serve as stops to limit the total amount of circumferential movement of the lever 63 to substantially 180°, though this may be varied as required in accordance with the port arrangement of the valve.

It will be seen that in accordance with the invention I provide means in a valve of the lift-turn type for retaining the stem plate member positively against its seat in each of its positions so that the plate cannot be dislodged accidentally or through surges of pressure in the liquid. No springs or other resilient mechanism is provided and the plate is positively seated in response to movement of the handle and not resiliently seated by action of a spring as in numerous prior art constructions.

I have also provided improved sealing means between the multiple ported members of the valve which require substantially less space than those heretofore employed and are cheaper to manufacture. The gaskets are extremely easy to replace and do not tend to break up under the compressive force and the resultant distortion as by being distorted over sharp corners or edges. Furthermore, the metal surfaces between which sealing occurs (the upper ends of the ferrules and the face of the stem plate) are close together so that proper pressure can be built up without undue distortion of the rubber. In the form shown in Fig. 5, a certain amount of side support is placed on the gasket without there being sharp edges over which the gasket can be distorted and damaged.

I claim:

1. The combination in a lift-turn valve of two multiple port members, one of said members having ferrules in its cooperating ports, individual gaskets extending around and over said ferrules, and means for lifting, turning and reseating the other of said ported members.

2. The combination in a lift-turn valve of two multiple port members, ferrules disposed in the ports of one of said members projecting therefrom toward the other member, and cylindrical resilient rubber gaskets disposed snugly around the projecting outer surface of said ferrules and projecting over the outwardly projecting end thereof to seal the junction between the ports of said members by compression of said projecting gasket portions between said other member and said ferrules.

3. The combination in a multiple port lift-turn valve of a ported body member, a ported stem plate member adapted to be moved in seating and unseating movement with respect to the body member, ferrules disposed in the ports of one of said members projecting toward the other member, and resilient gaskets in the form of cylinders seated over the projecting ends of said ferrules for contact against said other member to seal said members around said ports, said gaskets having an annular recess in one end defined by concentric wall portions for reception of the end of said ferrules, said wall portions hugging the inner and outer sides of said ferrules.

4. The combination recited in claim 3 wherein the projecting ends of said ferrules slope away from the inner surface of the ferrule at an acute angle.

5. The combination in a lift-turn valve of a ported body member, a ported stem plate member adapted to be moved in seating and unseating movement with respect to the body member, and resilient gasket means therebetween comprising metal ferrules positioned in the ports of one of said members and projecting therefrom, and rubber gaskets in the form of cylinders having annular recesses in one end thereof for the close reception of the end of said ferrule, the opposite end of the gasket being substantially flat through a substantial portion of its width.

6. The combination in a lift-turn valve of two multiple port members, ferrules disposed in the ports of one of said members projecting toward the other member, and individual resilient gaskets seated over the projecting ends of said ferrules for contact against said other member to seal said members around said ports, said gaskets having an annular recess in one end defined by concentric wall portions for reception of the end of said ferrules, said wall portions hugging the inner and outer sides of said ferrules, the opposite ends of said gaskets being substantially flat through a major portion thereof and being rounded in the area adjoining the side surfaces of the gasket.

7. The combination in a lift-turn valve of a ported body member, a ported stem plate member adapted to be moved in seating and unseating movement with respect to the body member, and resilient gasket means therebetween comprising metal ferrules positioned in the ports of one of said members and projecting therefrom, and individual rubber gaskets in the form of cylinders having annular recesses in one end thereof for the close reception of the end of said ferrule, the opposite end of said gasket curving outwardly to provide a convex arcuate surface, the opposite member of said valve having concave arcuate seats surrounding each port for the reception of the convex end of said gaskets to provide a seal around the ports.

8. The combination in a lift-turn valve of two multiple port members, ferrules disposed in the ports of one of said members projecting toward the other member, and individual resilient gaskets seated over the projecting ends of said ferrules for contact against said other member to seal said members around said ports, said gaskets having an inner wall extending within said end of the ferrules fitting snugly against the inner surface thereof, an outer wall of substantially greater thickness than said inner wall extending along the outer surface of the projecting portion of the ferrules to a point in spaced relation to said one of said members, and a connecting portion joining said walls, said portion having a convex arcuate outer surface, said other member having concave arcuate seats surrounding each port for the reception of the convex portion of the gaskets to provide a seal around the ports.

9. The combination in a plate type valve of two multiple port members, one of said members having ferrules in each of its cooperative ports, individual resilient rubber gaskets having radial faces extending around each of said ferrules, the other member having concave radial seats adapted to compress the resilient rubber gaskets of the other member, and means for lifting, turning and reseating one of the members.

LEE G. DANIELS.